Dec. 20, 1966 J. F. GRADO 3,292,936
PHONOGRAPH STYLUS
Filed June 11, 1964
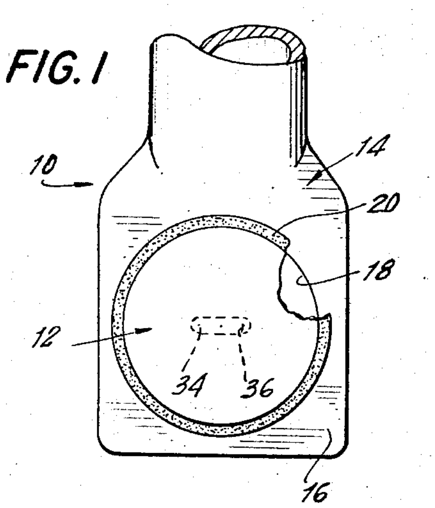
FIG. 1
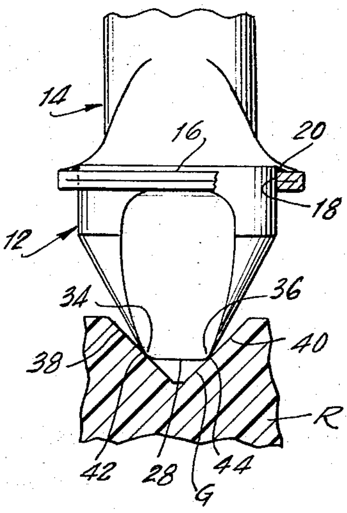
FIG. 2
FIG. 3
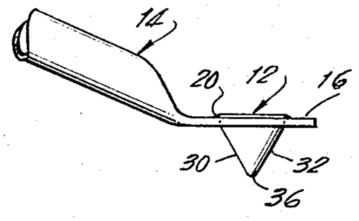
FIG. 4
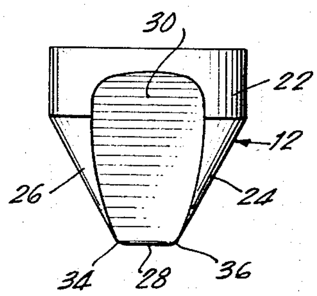
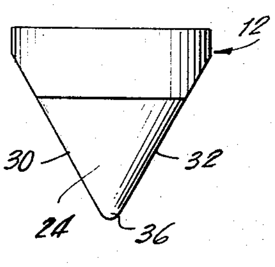
FIG. 5
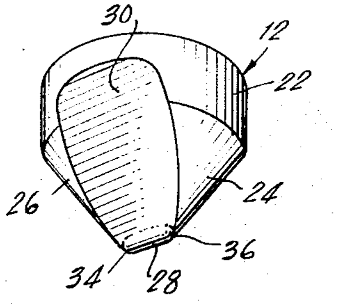
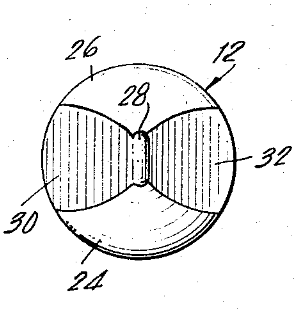
FIG. 6
FIG. 7
INVENTOR.
JOSEPH F. GRADO
BY Amster & Rothstein
ATTORNEYS 3,292,936
Patented Dec. 20, 1966

3,292,936

PHONOGRAPH STYLUS

Joseph F. Grado, 4614 7th Ave., Brooklyn, N.Y. 11220

Filed June 11, 1964, Ser. No. 374,525
6 Claims. (Cl. 274—38)

The present invention relates generally to phonograph equipment and particularly to an improved stylus for use in combination with an electrical transducer having a stylus beam. The stylus is adapted to be received within the grooves of a phonograph record and to make contact with those grooves for transmitting mechanical vibrations from the phonograph record to the transducer through the stylus beam.

In the art of audio reproduction, great advances have been made in the quality and performance characteristics of transducers which transform the mechanical variations in phonograph record grooves into electrical signals. Improved transducer elements have been developed as well as improved mountings, stylus beams, phonograph turntables, etc. Nevertheless, the need remains for substantial improvements in many areas of the art. Since the performance characteristics of every element in the equipment, starting from the microphone which receives the signal to be recorded, through the recording equipment and playback equipment, and finally to the speaker which reproduces the recorded sound, affects the quality and fidelity of the reproduction, the net performance of each of the elements and of the complete system is limited by the existence of imperfections in any or all of the separate elements. Therefore, maximum efforts must be made to achieve optimum performance from each individual element. The present invention is particularly concerned with the shape and performance of the stylus which is used to make mechanical contact between the electrical transducer carried in the tone arm and the walls of the record groove as the record and its grooves are rotated about the central axis of the disc.

Since the information which is impressed upon the disc is transmitted by the variations in the amplitude and frequency of vibrations in the groove of a phonograph record, and since those variations themselves vary from point to point along the length of the groove, it is desirable to obtain a stylus of the smallest radius possible to produce the smallest possible contact area, thereby to minimize tracking distortion. When the prior art conical stylus was polished to achieve a tip of extremely small radius, the point of the stylus penetrated downwardly into the depth of the record groove and contacted the bottom of the groove rather than riding on the opposed groove walls. Although the record groove is intended to be V-shaped, actually the point is not well defined at the bottom of the groove. When an extremely fine stylus is used, crackling and popping is a characteristic flaw due to contact of the stylus with foreign matter at the bottom of the groove. Accordingly, it is desirable to provide a stylus shape which both provides contact surfaces of extremely small radii, but which nevertheless precludes the possibility of the stylus bottoming in the phonograph groove.

Furthermore, it is desirable to provide a stylus shape wherein the contact surfaces consistently maintain the same physical orientation and shape with respect to the walls of the record grooves with which they are in contact. Specifically, there may be variations from point to point and from record to record in the width, depth and included angle of a record groove. It is desirable that the stylus, no matter wherealong the vertical extent of the groove it contacts, nor at what angle the wall grooves are oriented, constantly presents a single and uniform contact surface of predetermined radius. Still furthermore, it is desirable that the contact point has a radius which, in one direction, is uniform with its radius in a perpendicular orientation, i.e., it is desirable that the contact surface be a portion of a sphere.

It is generally an object of the present invention to provide a stylus construction of improved operating characteristics. Specifically, it is an object of the present invention to provide a stylus of a shape which provides one or more of the aforementioned desirable characteristics and which obviates one or more of the recited disadvantageous features of prior art constructions.

It is within the contemplation of the present invention to provide a stylus construction, wherein the stylus contacts the walls of a record groove with extremely small contact surfaces of small radii, which does not bottom in the grooves of standard phonograph records and which presents a uniform physical orientation to the walls of phonograph grooves of various widths, depths and included angles.

In accordance with one illustrative embodiment of the present invention, there is provided a phonograph stylus for use in combination with an electrical transducer having a stylus beam, the combination of which is effective to transpose the mechanical variations incorporated within the grooves of a phonograph record into electrical signals. The stylus comprises a body of hard material such as diamond, which is formed with a pair of spherical, groove-contacting surfaces at the bottom of the body, each of which is identical to the other and has identical radii. The centers of the spherical groove-contacting surfaces are spaced from each other within the body of the stylus a distance greater than the radii, and the surfaces themselves face in opposite directions. The body is formed with upwardly tapering walls from the groove-contacting surfaces at the bottom of the body, each of which is identical to the other and has identical radii. The centers of the spherical groove-contacting surfaces are spaced from each other within the body of the stylus a distance greater than the radii, and the surfaces themselves face in opposite directions. The body is formed with upwardly tapering walls from the groove-contacting surfaces towards an enlarged mounting portion by which the body is adapted to be mounted on the stylus beam. The body of the stylus between the spherical groove-contacting surfaces is relatively flat and is substantially parallel to the line between the centers of those surfaces.

Accordingly, it will be appreciated that the stylus may be positioned within the V-shaped groove of a phonograph record with the oppositely facing spherical groove-contacting surfaces engaged against opposite walls of the phonograph grooves.

The above brief description, as well as further objects, features and advantages of the present invention, will be best appreciated by reference to the following detailed description of one presently preferred embodiment of the invention when taken in conjunction with the accompanying drawings wherein:

FIG. 1 is a plan view of the outer tip of a stylus beam showing a stylus constructed in accordance with the present invention mounted on a stylus beam with portions of the structures broken away and some hidden portions illustrated in dotted lines;

FIG. 2 is a view of a stylus beam and phonograph record taken in a direction transverse to the grooves of the phonograph record (shown in section) showing the stylus in a front elevational view;

FIG. 3 is a side elevational view of the stylus and stylus beam shown in FIGS. 1 and 2;

FIG. 4 is an enlarged front elevational view of a stylus in accordance with the present invention;

FIG. 5 is a side elevational view similar to FIG. 4;

FIG. 6 is a bottom view of the stylus shown in FIGS. 4 and 5; and

FIG. 7 is a perspective view of the stylus according to the present invention, shown looking upwardly in a three-quarter view.

In FIG. 1 there is shown a stylus beam assembly, generally designated by the numeral 10, which includes a stylus 12 and stylus beam 14. The stylus beam 14 is constructed of thin wall tubing which has a flattened stylus-mounting portion 16 at an angle to the main body of the beam 14 and formed with an opening 18 (see FIG. 1) adapted to receive the stylus 12. The angle of the stylus mounting portion 16 of the stylus beam 14 is such that it will be parallel to the surface of a record, such as the record R shown in FIG. 2. When the stylus beam is mounted on a phonograph pickup, the other end of the stylus beam 14 is mechanically attached to a transducer, such as a crystal, a moving coil arrangement or the like. The stylus 12, having the particular shape in accordance with the present invention, is mounted within opening 18 by conventional means such as the adhesive material 20 seen in FIGS. 1 and 2.

The stylus 12 presents two distinctly different elevational views at 90° angles to each other, as may be best appreciated by progressively inspecting FIGS. 4 and 5. In FIG. 4 there is shown a front elevational view, as if one were looking down the length of a groove in which the stylus was positioned. The stylus 12 includes a mounting section 22 at its upper end which may be generally cylindrical and adapted to be received within the circular mounting opening 18 of the stylus beam 14. The lower portion 24 of the presently preferred embodiment of the stylus is generally conical in shape, having conical walls 26 which are trauncated at a bottom edge 28, formed by the intersection of two flats 30, 32 precisely formed on opposite sides of the stylus 12. The flats may be more easily recognized by viewing FIG. 5 showing those flat surfaces 30, 32 in profile view. At the bottom corners formed at the opposite ends of the bottom edge 28, there are formed two oppositely directed spherical surfaces 34, 36 which constitute the groove-contacting surfaces of the stylus 12. In the side view of FIG. 5, it will be seen that the bottom edge 28 of stylus 12 is not actually a sharp edge but, rather, forms a generally cylindrical surface of a radius equal to the radius of the spherical groove-contacting surfaces 34, 36. However, the particular shape of the stylus 12 in the area between the groove-contacting surfaces 34, 36 may vary to a great extent without affecting the basic operating characteristics of the stylus.

The spherical groove-contacting surfaces 34, 36, which are the essential shapes incorporated within the body of the body of the stylus 12, may be considered, from a point of view of conception of the shape and the entire stylus, to be a pair of spherical solids which are held in spaced relationship by the remaining material of the stylus 12. The significant point is that each of the surfaces 34, 36 is of an equal and uniform radius and that the surfaces are maintained in a spaced relationship to each other. The remainder of the stylus 12 may be of any shape which provides sufficient clearance from the walls of the grooves and provides means to mount the stylus.

The operational relationship of the stylus 12 and the stylus beam 14 may be best appreciated by reference to FIG. 3 showing the stylus 12 in position and engagement with a groove G of a record R. The groove G has two walls 38, 40 and the stylus 12 is positioned within the groove and in contact with the opposite walls at points 42, 44 corresponding to the spaced locations of the spherical groove-contacting surfaces 34, 36. It will be seen that the upwardly sloping angle of the conical walls 26 is sufficient to provide ample clearance of the upper portion of the body of the stylus 12 with respect to the walls of the groove G and it will be further appreciated that the bottom edge 28 assures adequate clearance of the stylus with respect to the bottom of the groove G. In accordance with the present invention, a large variety of shapes for the stylus body 12 may be employed as long as the spherical surfaces 34, 36 are maintained in rigid and spaced relationship and adequate clearance is provided above and below the groove-contacting surfaces 34, 36.

It will be appreciated that the constructions illustrated in accordance with the present invention provide for a phonograph record stylus in which the record-contacting points may be of a selectively small radius without making any effect upon the position or tracking characteristics of the stylus since the radius of the groove-contacting surfaces does not affect the point in the record surface groove which is contacted by the stylus. That point is determined solely by the remaining geometries of the stylus which geometries may be varied at will and are limited only by the techniques available to construct the stylus and the requirements for proper clearance angles adjacent the spherical groove-contacting surfaces 34, 36. It has been found that ratios of distance between the centers of the spherical groove-contacting surfaces and the radii of those surfaces themselves produce advantageous results in the range of 3 to 1 to 5 to 1. For example, it has been found that advantageous results are produced by a stylus having a distance between centers of the spherical contact surfaces 34, 36 of 0.001 inch with the radii of the two record-contacting surfaces 34, 36 being held to approximately 0.0002 inch for long playing records of the 33⅓ rotations per minute variety. For records designed to rotate at 78 revolutions per minute, stylus constructions with spacings between centers of contacting surfaces of approximately 0.003 inch and contact surface radii of about 0.0007 inch have been found to be quite successful. It will be appreciated that the engineer may select the vertical point at which contact to the walls of a record groove are desirable and, by simple manipulation of the spacing between the record-contacting surfaces, he may selectively choose that location. Similarly, the engineer may selectively choose to operate with a groove-contacting surface having a radius of virtually any given size limited only by the production techniques available and the strength of the material forming stylus.

In addition to the advantageous features of versatility as recited above, a stylus according to the present construction closely conforms to the location of the original cutting stylus during its relative movement within a record groove. Whereas the standard conical stylus having a single spherical contact surface will contact one wall of a record groove at one location and the other wall at a slightly advanced or retarded location due to the variation and angle of attack of the groove, such variation is reduced to virtually zero by the present construction. Further advantages will appear to the skilled technician.

Although the present invention has been shown and described herein as a single illustrative embodiment, it will be appreciated that many different sizes and shapes of stylii can be constructed without departing from the basic teachings of the use of a pair of small radius, groove-contacting surfaces on opposite sides of a single stylus. Accordingly, the following claims should be construed broadly and in a manner consistent with the spirit and scope of the invention.

What I claim is:

1. A phonograph stylus for use in combination with a transducer for transposing mechanical variations in the grooves of a phonograph record into electrical signals comprising a body, said body having a pair of spherical groove-contacting surfaces at the lower end thereof, said groove-contacting surfaces facing in opposite directions and being spaced from each other a distance greater than their radii, said body extending upwardly from said groove-contacting surfaces to a mounting portion by which said body is adapted to be mounted to said electrical transducer.

2. A phonograph stylus for use in combination with an electrical transducer for transposing mechanical variations in the grooves of a phonograph record into electrical signals comprising a body of a hard material, said body having a pair of spherical groove-contacting surfaces at the bottom thereof of identical radii, said groove-contacting surfaces facing in opposite directions and being spaced from each other a distance greater than said radii, said body tapering upwardly from said groove-contacting surfaces to a mounting portion by which said body is adapted to be mounted to said electrical transducer.

3. A phonograph stylus for use in combination with an electrical transducer having a stylus beam for transposing mechanical variations in the grooves of a phonograph record into electrical signals comprising a body of a hard material, said body having a pair of spherical groove-contacting surfaces at the bottom thereof of identical and uniform radii, said groove-contacting surfaces facing in opposite directions and spaced from each other a distance greater than said radii, said body tapering upwardly from said groove-contacting surfaces with an included angle of not more than 60 degrees to a mounting portion by which said body is adapted to be mounted to said stylus beam.

4. A phonograph stylus for use with electrical transducers for transposing mechanical variations in the grooves of a phonograph record into electrical signals comprising a body of hard material having a frontal cross section comprising an upper edge, a lower edge spaced from said upper edge and a pair of side edges tapering downwardly from the upper edge to the lower edge, said side edges joining said lower edge at a pair of oppositely disposed contact edges of uniform radii, said body having a transverse cross section including an upper edge, a pair of side edges tapering downwardly, and a bottom curve joining said side edges, said body at said contact edges being formed with spherical groove-contacting surfaces of uniform and equal radii adapted to engage opposite walls of a phonograph record groove.

5. A phonograph stylus for use with electrical transducers for transposing mechanical variations in the grooves of a phonograph record into electrical signals comprising a body of hard material having a frontal cross section comprising an upper edge, a lower edge spaced from said upper edge and a pair of side edges at opposite and equal angles to the vertical, tapering the frontal cross section of said body from the upper edge to the lower edge, said side edges joining said lower edge at a pair of oppositely disposed contact edges of uniform radii, said body having a transverse cross section including an upper edge, a pair of side edges at opposite and equal angles to the vertical, tapering said transverse cross section downwardly, and a bottom curve joining said side edges, said body at said contact edges being formed with spherical groove-contacting surfaces of uniform and equal radii adapted to engage opposite walls of a phonograph record groove.

6. A phonograph stylus for use in combination with a transducer for transposing mechanical variations in the grooves of a phonograph record into electrical signals comprising a body, said body having a pair of spherical groove-contacting surfaces at the lower end thereof, said groove-contacting surfaces facing in opposite directions, having identical and uniform radii, and spaced from each other a distance between three and five times greater than said radii, said body tapering upwardly from said groove-contacting surfaces to a mounting portion by which said body is adapted to be mounted to said transducer.

References Cited by the Examiner

UNITED STATES PATENTS 2,573,723 11/1951 McClain ------------ 274—38

FOREIGN PATENTS 603,606 6/1948 Great Britain.
768,414 2/1957 Great Britain.

NORTON ANSHER, *Primary Examiner.*

CLIFFORD B. PRICE, *Examiner.*